2,016,430

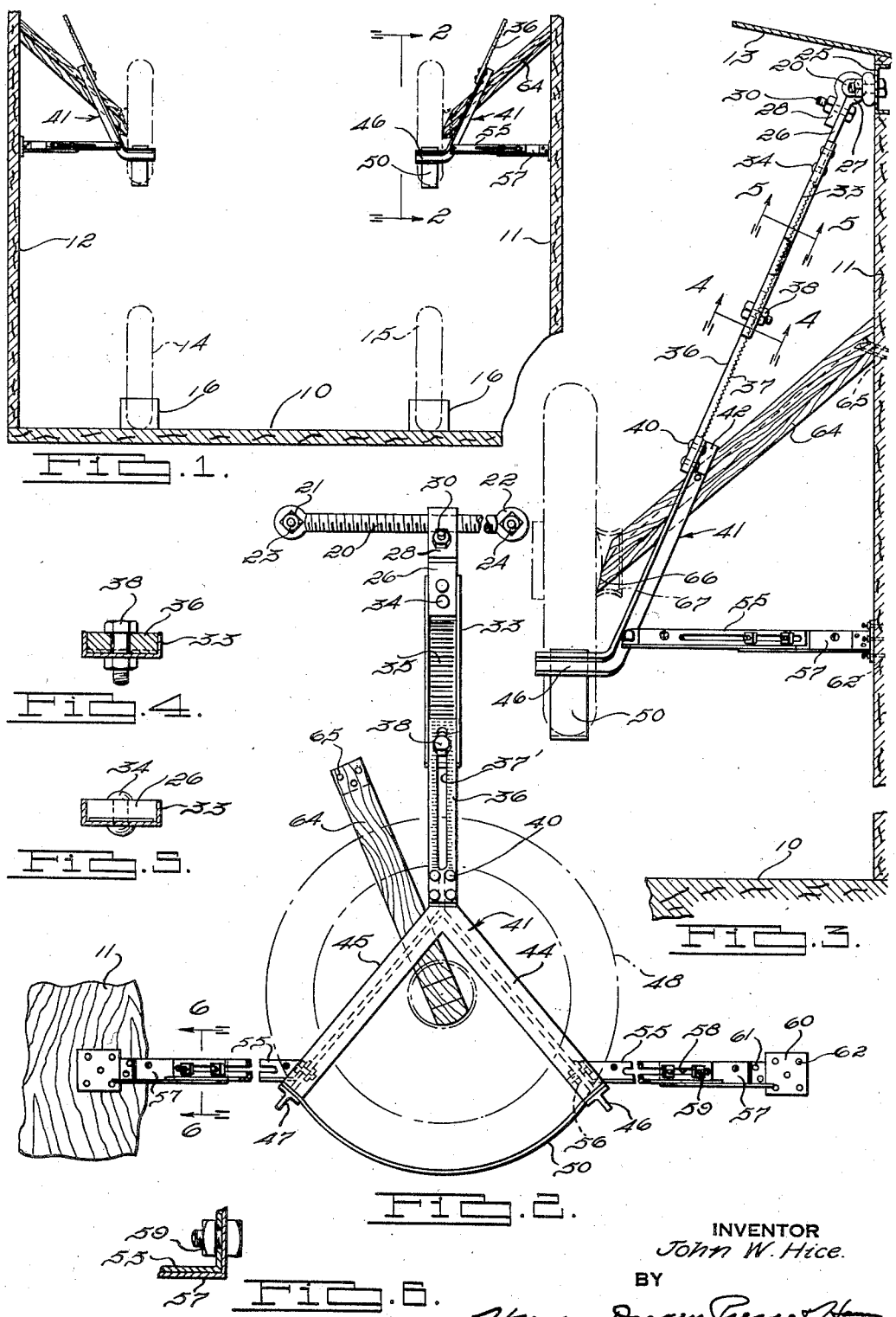
Oct. 8, 1935. J. W. HICE 2,016,430
CAR LOADING DEVICE
Filed Nov. 11, 1931
INVENTOR
John W. Hice.
BY
ATTORNEYS Patented Oct. 8, 1935

UNITED STATES PATENT OFFICE 2,016,430

CAR LOADING DEVICE

John W. Hice, Detroit, Mich., assignor, by mesne assignments, to The Worth Company, a corporation of Michigan Application November 11, 1931, Serial No. 574,385

4 Claims. (Cl. 105—368)

The invention relates to loading devices and it has particular relation to devices for loading motor vehicles in freight cars for transportation purposes.

The principal objects of the invention are to provide a car loading device of the above mentioned character, which is of inexpensive construction, and which operates in a highly efficient manner particularly for mounting and supporting vehicles in a freight car in a so-called decking arrangement; to provide a car loading device for this purpose, which can easily be adjusted for accommodating vehicles of different sizes and lengths; to provide a loading device of the above mentioned type, which can be associated with a freight car without requiring many manual operations and accordingly without involving much expense incidental to labor; and in general to provide a car loading device of simple construction, which positively supports the vehicle in proper position against undesirable movement during transportation thereof and which can easily be associated with the freight car and vehicle and be released from the vehicle to permit removal of the latter from the freight car.

For a better understanding of the invention reference may be had to the accompanying drawing, forming a part of the specification, wherein:

Figure 1 is a fragmentary, transverse cross sectional view of a freight car, illustrating the manner in which car loading devices constructed according to one form of the invention, are mounted for the purpose of supporting a motor vehicle in the car;

Fig. 2 is a lateral view, on a larger scale, taken substantially along the line 2—2 of Fig. 1;

Fig. 3 is an enlarged view illustrating in greater detail, one of the devices employed for supporting one of the vehicle wheels in a position above the floor of the car;

Fig. 4 is a cross sectional view on a slightly larger scale taken substantially along the line 4—4 of Fig. 3;

Fig. 5 is a cross sectional view on a slightly larger scale, taken substantially along line 5—5 of Fig. 3;

Fig. 6 is a cross sectional view, on a slightly larger scale, taken substantially along the line 6—6 of Fig. 2.

Referring to Figs. 1 and 3 the freight car fragmentarily illustrated, includes a floor 10, side walls 11 and 12, and a roof 13. In mounting a motor vehicle in the car, by using devices constructed according to the invention, it is particularly desired that the wheels at one end of the vehicle and ordinarily the rear wheels thereof, be supported directly on the floor 10 of the car, and that the front wheels be elevated. This manner of mounting disposes the vehicle in an inclined plane, thereby permitting a part of another vehicle to be moved under the elevated part of the vehicle disposed in the inclined plane. Hence as seen in Fig. 1, it is desired that one set of wheels, indicated at 14 and 15 be positioned on the floor 10 by means of blocks 16 secured directly to the floor at the front and rear sides of each wheel. Ordinarily the blocks 16 will be employed to secure such set of wheels to the floor before the opposite end of the vehicle is elevated, although manifestly the blocks may be applied after such other end of the vehicle is elevated and secured in elevated position. For securing and supporting the other vehicle wheels in elevated positions in the freight car, loading devices are associated with the side walls 11 and 12 respectively, and since such devices are alike, although oppositely disposed, only one need be described.

Referring to Figs. 2 and 3 particularly, a screw member 20 is provided which has at opposite ends, offset flat eye portions 21 and 22, and bolts 23 and 24 extending through the eye portions 21 and 22 respectively, secure the screw member 20 at opposite ends to a channel iron 25, located in the side wall of the freight car adjacent the roof 13. Providing the screw member 20 with offset eye portions 21 and 22, causes the intermediate and body portion of the screw to be located in spaced relation with respect to the side wall of the car. As best shown by Fig. 3, an arm 26 has an upper, substantially cylindrical end 27 embracing the screw member 20 and a clamping end portion 28. A bolt 30 connecting the arm 26 to its end portion 28, serves to clamp the cylindrical end 27 to the screw member. It should be understood that the inner surface of the cylindrical end 27 is threaded complementarily to the threads on the screw member 20 so as to avoid injury to the screw threads on the latter, while at the same time providing means for adjusting the screw 26 along the screw through small increments. While the bolt 30 clamps the arm 26 to the screw member, it is apparent that this clamping action need not be such that pivotal movement of the arm 26 about the axis of the screw would be prevented, and preferably such pivotal movement is desired. Adjustment of the arm 26 along the screw, of course, can be effected by removing the latter from the side wall of the car and then turning it as desired.

Now as best shown by Fig. 2, the arm 26 projects into the upper end of a channel iron 33 and is secured thereto by means of rivets 34. The inner surface of the base of the channel arm 33 is provided with what may be termed rack teeth 35 extending transversely of the arm and a bar 36 complementary to the channel is provided with rack teeth 37 shown by Fig. 3, that cooperate with the rack teeth 35. The bar 36 is adjustably secured to the iron 33 by means of an elongated slot 37' in the bar and a bolt 38 extending through the slot and through the base of the iron. It is apparent that upon loosening the bolt, the bar may be moved longitudinally of the iron and then secured thereto against relative, longitudinal movement by tightening the bolt. The teeth on the iron and bar, positively prevent such relative, longitudinal movement of the bar and iron when the bolt 38 is tightened, while at the same time they provide a means for accurately adjusting the members through small increments of movement.

The lower end of bar 36 is riveted as indicated at 40, to an inverted V shaped supporting member 41 constructed of T iron preferably. At the apex of the member 41, the latter is provided with a projecting portion 42 aligned with the bar 36 and it is to this portion preferably that the bar is secured by means of the aforementioned rivets. The inverted V shaped member 41 comprises downwardly diverging arms 44 and 45 that terminate in their lower ends respectively in laterally projecting portions 46 and 47 extending substantially horizontally and toward the center of the freight car. The laterally projecting portions 46 and 47 are adapted to partially embrace and support the lower part of a vehicle tire indicated at 48. As a further support for the tire, a metal strap 50 having a radius of curvature substantially equal to that of the tire is secured at opposite ends to the portions 46 and 47 and is adapted to support the tire between such portions.

From the above description, it is apparent that a cradle-like device is provided for supporting each of the elevated wheels of the vehicle, and that this device is suspended from a single point and particularly from a pivotal point adjacent the roof of the car and located on the side wall thereof. It is likewise apparent that this pivotal point is movable through small increments of movement merely by clamping the arm 26 to the screw 20 at various places along the latter and that this adjustment can be made accurately because the arrangement permits adjustment through an increment of movement as small as the pitch length of the screw thread on the screw. It is likewise apparent that the tire embracing device can be raised or lowered through small increments of movement merely by adjusting the channel iron 33 with respect to the bar 36 and that when once adjusted the parts remain positively associated without movement owing to the fact that the rack teeth on the respective parts positively prevent such movement. Also, it is apparent that these teeth take the load instead of allowing such load to be imparted to the bolt 38 securing the channel iron and bar 36 together and hence the bolt primarily is used only for maintaining the teeth in cooperating positions.

For maintaining the tire embracing device spaced from the side wall of the car, each of the legs 44 and 45 of the V shaped member 41, is secured to an angle iron 55 by means of a bolt 56, and such angle iron is adjustably secured to a second angle iron 57 by means of a slot 58 in the first iron, and bolts 59 projecting through the iron 57 and such slot. Hence the effective length of both irons may be varied as desired and by tightening the bolts such irons can be positively secured together against any change in length. The remote end of iron 57 is secured to a plate 60 by means of rivets 61 and the plate 60 is adapted to be secured to the side wall of the car by any suitable securing means such as nails indicated at 62 in Fig. 3 which project through openings in the plate. It is obvious that bolts or other suitable securing means may be used instead of nails, but preferably the nails will be used because the plates can be secured more readily to the wall of the freight car in the position desired.

The angle irons 55 and 57 at each end of the V shaped member 41, extend longitudinally and obliquely toward the side walls of the freight car in diverging relation and hence constitute braces for preventing longitudinal as well as transverse movement of the tire embracing device. For further locating the vehicle positively in position and preventing its movement transversely of the car, a bar 64 which may be constructed of wood, is secured to the wall of the car by means of nails 65 for example and extends obliquely and downwardly to the axle of the vehicle. The lower end of the bar preferably is tapered as indicated at 66 and is adapted to project into the hub portion of the wheel indicated at 67 when the hub cap (not shown) is removed. The bars 64 at opposite sides of the freight car together prevent transverse movement of the axle of the vehicle although it is apparent that the angle irons 55 and 57 in conjunction with the V member 41, also assist in preventing any transverse movement of the latter. However, inasmuch as the metal strap 50 and the offset portions 46 and 47 of the arms 44 and 45, may not prevent small movements of the vehicle wheels transversely of the car, the advantage of using the bars 64 to positively prevent any movement of the vehicle axle transversely of the car should be apparent. In this connection it is desired to call attention to the fact that the sides of the tires on the wheels are not necessarily engaged by any parts of the loading device and this arrangement is preferable, because it simplifies mounting the vehicle in position.

A car loading device of the type described is of inexpensive construction and may readily be applied for the purpose of supporting one set of wheels of the vehicle in an elevated position. The fine adjustability of the parts permits accurate mounting of the vehicle in the car in a simple and easy manner, and once the vehicle is mounted in an inclined position, movement thereof longitudinally or transversely of the car is positively prevented. It is also apparent that the loading devices may be easily applied to the freight car as well as to the vehicle and hence that little labor is required in their use. Constructing the main supporting parts of the device of iron and particularly certain parts thereof of channel, T iron and angle iron, greatly enhances the strength of the device. In general the device is highly efficient in operation, capable of easy manipulation, and durable throughout the life of the car.

Although only one form of the invention has been illustrated and described in detail, it will be apparent to those skilled in the art that various modifications may be made without departing from the scope of the appended claims.

I claim:

1. A car loading device comprising a screw connected to an upper part of the car and extending longitudinally thereof, a clamping member embracing the screw and having threaded engagement therewith, a rack bar operatively connected to the clamping member, a second rack bar adjustably connected to the first rack bar, diverging arms extending downwardly from the end of the second rack bar, and offset portions on said arms for engaging a vehicle wheel.

2. A car loading device comprising a screw connected to an upper part of the car and extending longitudinally thereof, a threaded clamping member embracing the screw, a rack bar operatively connected to the clamping member, a second rack bar adjustably connected to the first rack bar, diverging arms extending downwardly from the lower end of the second rack bar, and a tire embracing strap connecting the lower ends of the arm.

3. A car loading device comprising a screw extending longitudinally of the car and connected to an upper part thereof, means having threaded engagement with the screw and extending downwardly and inwardly of the car, said means terminating in downwardly diverging arms, and strap means connecting the lower ends of the arms and adapted to embrace a vehicle tire and support the latter in the car.

4. A car loading device comprising a screw extending longitudinally of the car and connected to the upper part thereof, means having threaded engagement with the screw and extending downwardly and inwardly of the car, diverging arms on the lower extremity of such means, a strap connecting the lower ends of such arms and adapted to embrace a vehicle tire, and means for bracing the vehicle wheel against lateral and longitudinal movement in the car.

JOHN W. HICE.